No. 154,898

UNITED STATES PATENT OFFICE.

ANTONIO PELLETIER, OF WASHINGTON, DISTRICT OF COLUMBIA.

IMPROVEMENT IN ARTIFICIAL STONE.

Specification forming part of Letters Patent No. 154,898, dated September 8, 1874; application filed November 5, 1873.

*To all whom it may concern:*

Be it known that I, ANTONIO PELLETIER, of Washington city, in the county of Washington and District of Columbia, have invented certain Improvements in Artificial Stone and roofing material, of which the following is a specification:

My invention relates to a cement or compound to be used for foot-walks, building, and roofing purposes; and it consists in the combination and proportion of materials used as hereinafter explained.

In preparing the compound for artificial stone, pavements, tile, and similar purposes, I use, first, sand, pulverized sand-stone, coke screenings, iron slag, scoria, or cinders, or an admixture of two or more of these or similar hard substances, to form the body, using, by measure, five parts. To this I add hydraulic or Portland cement, two parts; of any mineral oxide, one part; and then add lime-water in quantity sufficient to reduce the mass to a plastic state, and thoroughly agitate or mix the whole. When thus prepared the compound is placed in molds of any required form or size, and allowed to harden. The surface is then thoroughly washed with the chloride corresponding to the oxide previously used in the composition, which completes the operation.

If it be desired to impart to the stone a different color, it may be done by adding to the mass, while being mixed, any coloring material desired, mineral pigments being always preferred, as being most durable, and as not affecting the solidity of the product.

It is obvious that any form or style of building-block may be thus formed by using the proper molds, and that for pavements or walks it may be formed into tile or be laid in a plastic state, and allowed to harden or set in place.

The stone or compound thus formed is extremely hard and durable, besides being much cheaper than ordinary cut stone.

When it is desired to use the material for roofing purposes, in which case it is applied in a plastic condition upon the roof-boards, thus forming a comparatively thin layer, and which is, therefore, more liable to crack, there may be added a small portion of asbestus, or any fibrous matter that will bind the particles composing the mass together, and tend to prevent its cracking. In such case it is obvious that the chemical character of the compound is not changed, the fiber merely acting mechanically, and not chemically, to bind the mass together. A roof thus prepared is fireproof, and almost indestructible, and it may be painted or colored to suit the fancy.

The compound, for whatever purpose used, may, if preferred, be colored, by applying a suitable coloring matter in a liquid form to its surface prior to washing it with the chloride, or in case it is to be molded the coloring matter may be placed in the mold first, and then the compound placed therein, it being merely a matter of choice as to which plan is adopted, the choice depending somewhat upon the purpose for which the article is prepared.

Having thus described my invention, what I claim is—

The herein-described compound for forming artificial stone, roofing, and similar purposes, consisting of a body composed of sand, pulverized stone, coke screenings, iron slag or similar solid material, with hydraulic cement, mineral oxide, and a corresponding chloride, with or without asbestus, united in the proportions and manner substantially as set forth.

ANTONIO PELLETIER.

Witnesses:
WILLIE W. DODGE,
C. F. MURDOCK.